US007431136B2

(12) United States Patent
Simm et al.

(10) Patent No.: US 7,431,136 B2
(45) Date of Patent: Oct. 7, 2008

(54) HAND POWER TOOL WITH A CLUTCH

(75) Inventors: Robert Simm, Oekingen (CH); Simon Isch, Bern (CH); Martin Feldmann, Aegerten (CH)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 11/294,901

(22) Filed: Dec. 6, 2005

(65) Prior Publication Data

US 2006/0131121 A1 Jun. 22, 2006

(30) Foreign Application Priority Data

Dec. 9, 2004 (DE) ...................... 10 2004 059 331

(51) Int. Cl.
*B25B 31/00* (2006.01)
*F16D 11/14* (2006.01)
*F16D 43/20* (2006.01)

(52) U.S. Cl. .................... 192/34; 192/54.5; 192/69.82; 192/110 B; 81/475

(58) Field of Classification Search .................. 192/34, 192/69.82, 100; 81/475
See application file for complete search history.

(56) References Cited

U.S. PATENT DOCUMENTS

| | | | | |
|---|---|---|---|---|
| 4,947,714 | A | 8/1990 | Fluri | |
| 5,209,308 | A * | 5/1993 | Sasaki | 192/34 |
| 5,568,849 | A * | 10/1996 | Sasaki et al. | 192/34 |
| 2003/0023917 | A1 | 1/2003 | Richardson et al. | |
| 2005/0150735 | A1 * | 7/2005 | Donner | 192/34 |

FOREIGN PATENT DOCUMENTS

| | | |
|---|---|---|
| EP | 0 437 060 | 7/1991 |
| EP | 0 666 145 | 8/1995 |

* cited by examiner

*Primary Examiner*—Rodney H Bonck
(74) *Attorney, Agent, or Firm*—Michael J. Striker

(57) ABSTRACT

A hand power tool has a clutch, a motor, a drive shaft located at a side of the motor, a driven shaft to be located at a side of a workpiece, a clutch which couples the drive shaft and the driven shaft and enters into engagement when pressure is exerted on the driven shaft, and the clutch is provided with a clutch engagement aid.

13 Claims, 4 Drawing Sheets

HAND POWER TOOL WITH A CLUTCH

BACKGROUND OF THE INVENTION

The invention relates to a hand power tool having a clutch.

CROSS-REFERENCE

The invention described and claimed hereinbelow is also described in DE 10 2004 059331.0, filed Dec. 9, 2004. This German Patent Application, whose subject matter is incorporated here by reference, provides the basis for a claim of priority of invention under 35 U.S.C. 119 (a)-(d).

A hand power tool of this kind is used in particular as a so-called dry construction screwdriver. With a dry construction screwdriver, screws can be screwed in to a uniform depth. To that end, the clutch has a drive shaft toward the motor and a driven shaft toward the workpiece, and the clutch engages under pressure on the driven shaft and disengages in cooperation with a depth stop located on the hand power tool. The screw to be inserted is pressed against the wall with the driven shaft and with an attachment or bit that is necessary for engagement with the screw. Because of the counterpressure on the driven shaft, the clutch engages. The driven shaft is driven by the drive shaft. The screw is inserted into the wall. Once the screw reaches the set depth, the pressure exerted on the screw by the hand power tool is absorbed by the depth stop that presses against the wall. The pressure on the driven shaft lets up the clutch disengages. The driven shaft is no longer driven.

A dry construction screwdriver operates at high rotary speeds of up to 6000 rpm. In the clutch engagement operation, a driving part that is rotating at high rotary speed must accordingly be coupled to a stationary driven part by means of the clutch. For a dry construction screwdriver, clutches are known that couple by means of slaving. The clutch engages once the clutch parts have come close enough to one another, or when a sufficiently high pressure is exerted on the clutch parts.

SUMMARY OF THE INVENTION

It is therefore an object of the present invention to provide a power hand tool with a clutch, which is a further improvement of the existing hand power tools.

The invention is based on a hand power tool, having a clutch, a drive shaft toward the motor, and a driven shaft toward the workpiece, in which the drive shaft and the driven shaft can be coupled by means of the clutch that engages when pressure is exerted on the driven shaft.

It is proposed according to the invention that the clutch includes a clutch engagement aid. Even with only gradual pressure on the driven shaft, clutch engagement can be done quickly and completely. An unpleasant production of noise from the overlooking or lining up of the clutch parts, and high wear that is associated with this, can be avoided. The term "clutch engagement aid" can be understood to mean any design or device of mechanical, electrical or magnetic type that in addition to the pressure reinforces and/or speeds up the clutch engagement operation by the driven shaft. For instance, the pressure on the clutch parts can be increased mechanically, electrically or magnetically.

In a preferred embodiment of the invention, the clutch includes a first clutch half, connected to the drive shaft, and a second clutch half, connected to the driven shaft, and the driven shaft is passed through both clutch halves. As a result, the clutch halves can be stably supported with only a few components. Advantageously, the clutch includes a gear wheel that drives the clutch halves, and the driven shaft is also guided by the gear wheel. Expediently, both clutch halves and in particular the gear wheel as well are supported directly or indirectly on the driven shaft. The bearing of the drive shaft can be made especially economical and long-lived if the drive shaft is supported in two bearings, which are located one on either side of the clutch in the axial direction. Only a slight tilting moment occurs, and as a result the driven shaft can be supported in simple slide bearings.

An especially stable, compact clutch can be achieved if the clutch has a gear wheel, and the clutch engagement aid is located between the gear wheel and a first clutch half connected to the drive shaft. The gear wheel here is advantageously a gear wheel that drives the clutch halves and is connected to the drive shaft.

A compact, economical clutch can be achieved if the clutch has a gear wheel, which is connected to the drive shaft, is rotatable relative to the driven shaft, and is located surrounding the driven shaft, and in particular is supported on the driven shaft.

Advantageously, the clutch has a first clutch half connected to the drive shaft and a second clutch half connected to the driven shaft, and the clutch engagement aid is designed as additionally shortening the spacing of the clutch halves when pressure is exerted on the driven shaft. This version achieves a clutch engagement aid that is economical and can easily be realized in hand power tools of a conventional design.

Upon an initial clutch engagement, the clutch engagement aid can reinforce the clutch engagement operation by moving the clutch halves toward one another, for instance pulling them together or into one another. Moreover, when pressure is exerted on the driven shaft, the clutch engagement can for instance be tripped electrically or magnetically by an approach of the clutch halves. The driven shaft itself need not be axially displaceably supported then.

Advantageously, the clutch engagement aid converts a rotary motion into a translational motion. A difference in a rotary motion of the two shafts can be converted into a coupling motion of the clutch and/or an approach motion of the two clutch halves.

In a preferred mechanical embodiment, the driven shaft and with it the second clutch half are supported axially displaceably. The axially displaceable driven shaft, when pressure is exerted on it, moves the second clutch half toward the first clutch half. Now, in addition to the displacement by the driven shaft, the clutch engagement aid now shortens the spacing of the clutch halves. Thus the clutch engagement operation no longer exclusively follows the motion of the driven shaft; instead, the clutch parts move more quickly toward one another. The clutch engagement takes place faster and even with only gradual pressure on the driven shaft.

In a further embodiment of the invention, the clutch has a first clutch half connected to the drive shaft and a second clutch half connected to the driven shaft, and upon clutch engagement, an initial rotational slaving of the second clutch half by the first clutch half leads to a complete clutch engagement. A clutch engagement operation can be achieved reliably and regardless of the geometry of elements touching one another in the two clutch halves.

Expediently, the clutch has a first clutch half connected to the drive shaft and a second clutch half connected to the driven shaft, and as a clutch engagement aid, at least one of the clutch halves is supported displaceably in the axial direction in its bearing and is in engagement with a ramp contour, extending in the circumferential direction, of a counterpart or gear element of the drive shaft and/or driven shaft. In this embodiment, the thus-supported clutch half moves along with the driven shaft and/or drive shaft. The clutch half is in engagement with a ramp contour of the counterpart or gear element.

By means of the ramp contour extending in the circumferential direction, a relative rotation of the clutch half to the drive shaft and/or driven shaft is permitted. If the clutch half is rotated relative to the drive shaft and/or the driven shaft, then it runs on the counterpart or gear element along the ramp contour. By means of the ramp, the clutch half is thus axially displaced relative to the counterpart or gear element. The ramp contour brings about a further shortening of the spacing of the clutch halves, as soon as a relative rotation of the thus-supported clutch half occurs relative to the counterpart or gear element. This version is simple and mechanically easy to achieve.

In a further advantageous embodiment, the at least one clutch half is in engagement with three ramp contours of the counterpart or gear element. In this way, the clutch half can be guided at three points, so that wobbling of the clutch half, especially upon clutch engagement, relative to the counterpart or gear element is avoided.

It is also advantageous if the at least one clutch half likewise has a number of ramp contours, so that the clutch half and the counterpart or gear element are in mutual engagement via ramp contours. This embodiment is especially secure and stable.

Advantageously, the drive shaft drives a gear wheel, as a gear element, on which the first clutch half, meshing with the gear element via the at least one ramp contour, is supported axially displaceably. This makes a secure support of the first clutch half possible and takes existing structural conditions of hand power tools into account. Via the driven gear wheel, the desired gear ratio with respect to the drive motor is established.

Expediently, the ramp contour includes regions of different slope. As a result, very specifically required conditions for the hand power tool can be met. For instance, via a rising slope along the ramp contour, the clutch engagement operation can be initiated gently and finally—at the end of the ramp contour having the pronounced slope—concluded quickly and stably with a fast clutch engagement.

Economical manufacture of the clutch can be achieved if the two clutch halves are designed identically.

As already noted at the outset, the invention is not limited to a mechanical clutch engagement aid. Advantageously, the clutch engagement aid may also be designed electromechanically.

Further advantages will become apparent from the ensuing description of the drawings. In the drawings, exemplary embodiments of the invention are shown. The drawings, description and claims include numerous characteristics in combination. One skilled in the art will expediently consider these characteristics individually as well and put them together to make useful further combinations.

The novel features which are considered as characteristic for the present invention are set forth in particular in the appended claims the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
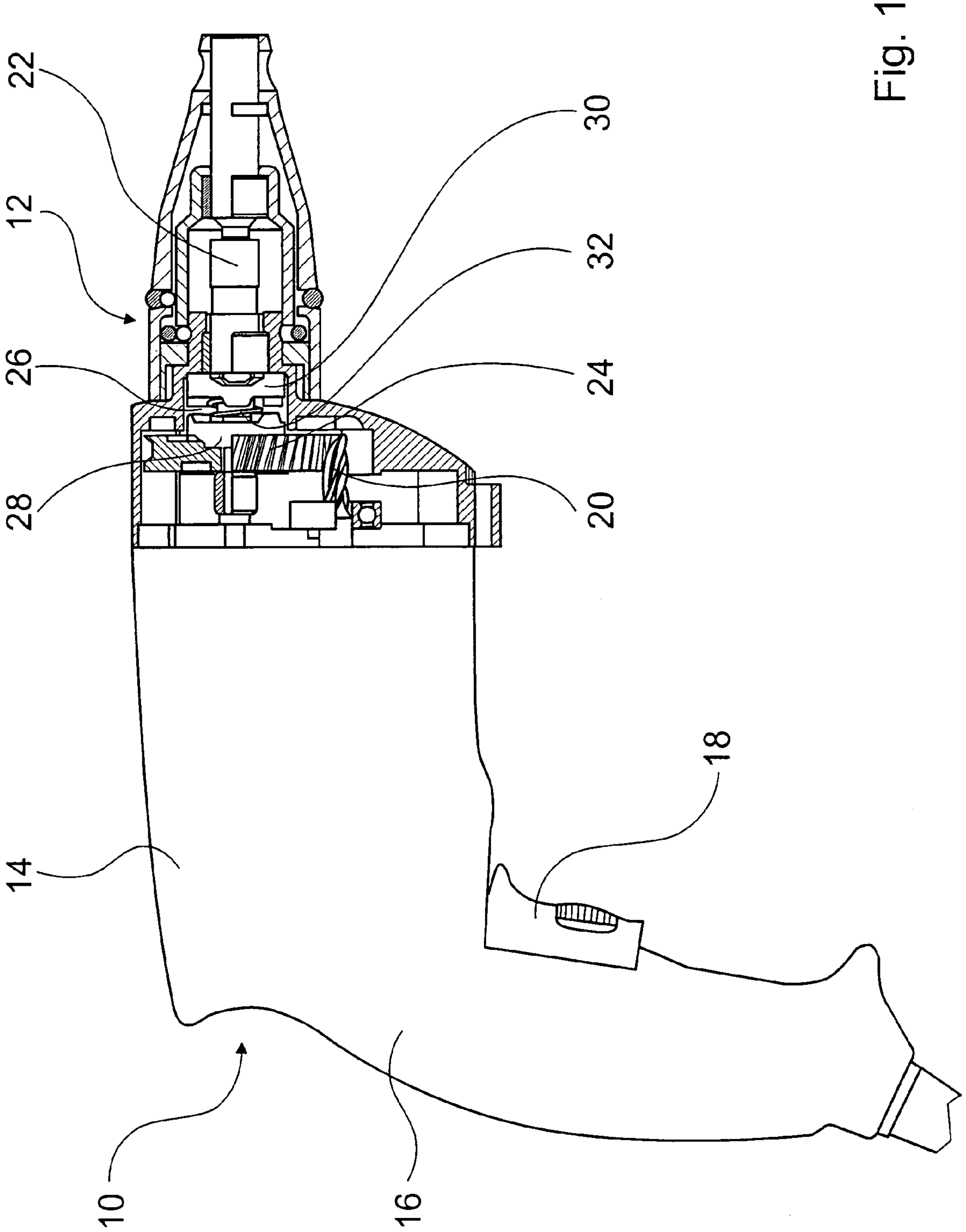
FIG. 1, in a partly open view, shows a dry construction screwdriver with a clutch between a drive shaft and a driven shaft.

FIG. 1, in a partly open view, shows a dry construction screwdriver 10. For illustrating its construction, the device head 12 is shown opened. As for the rest of the device, what is shown is the outer housing 14 with a handle 16 and an actuating element 18. In the opened device head 12, the drive shaft 20, driven by the motor that is located beneath the housing 14 and is not visible, and the multiply supported driven shaft 22 can be seen. The drive shaft 20 drives a gear wheel 24, which is shown partly in section and partly in perspective. The drive shaft 20 and the gear wheel 24 form a gear.

Between the gear wheel 24 and the driven shaft 22, there is a clutch 26, which when pressure is exerted on the driven shaft 22 couples the drive shaft 20 and the driven shaft 22 to one another. For this purpose, the clutch 26 has a first clutch half 28 and a second clutch half 30. The two clutch halves 28, 30 are shaped identically. The first clutch half 28—as a clutch engagement aid, it is axially and tangentially displaceable relative to the gear wheel 24—meshes with the gear wheel 24. The second clutch half 30 is force-lockingly connected to the driven shaft 22. The driven shaft 22 and the second clutch half 30 are jointly supported axially displaceably in the dry construction screwdriver 10. The driven shaft 22 is supported in two bearings 31, which are disposed one on either side of the clutch 26 in an axial direction 38, and thus one bearing 31 is located in front of the clutch 26, and one bearing 31 behind it, in the axial direction 38. By means of this bearing of the driven shaft 22 outside the clutch 26, only a slight tilting moment occurs on the driven shaft 22, and as a result, ball bearings can be dispensed with, and the bearings 31 can be designed as simple slide bearings.

A pressure exerted on the driven shaft 22 when a screw is being inserted is absorbed by means of a mechanical spring element 32, which is fastened between the two clutch halves 28 and 30.

When pressure is exerted on the driven shaft 22, the second clutch half 30 approaches the first clutch half 28. When the two clutch halves 28 and 30 touch, the first clutch half 28 experiences a relative rotation relative to the gear wheel 24, and this motion, via a ramp contour that is not visible in FIG. 1, leads to a motion of the first clutch half 28 toward the second clutch half 30. Because of the additional motion of the first clutch half 28, even only gradual pressure on the driven shaft 22 causes no problems the clutch 26 rapidly engages, without overlocking.

Figure 2:
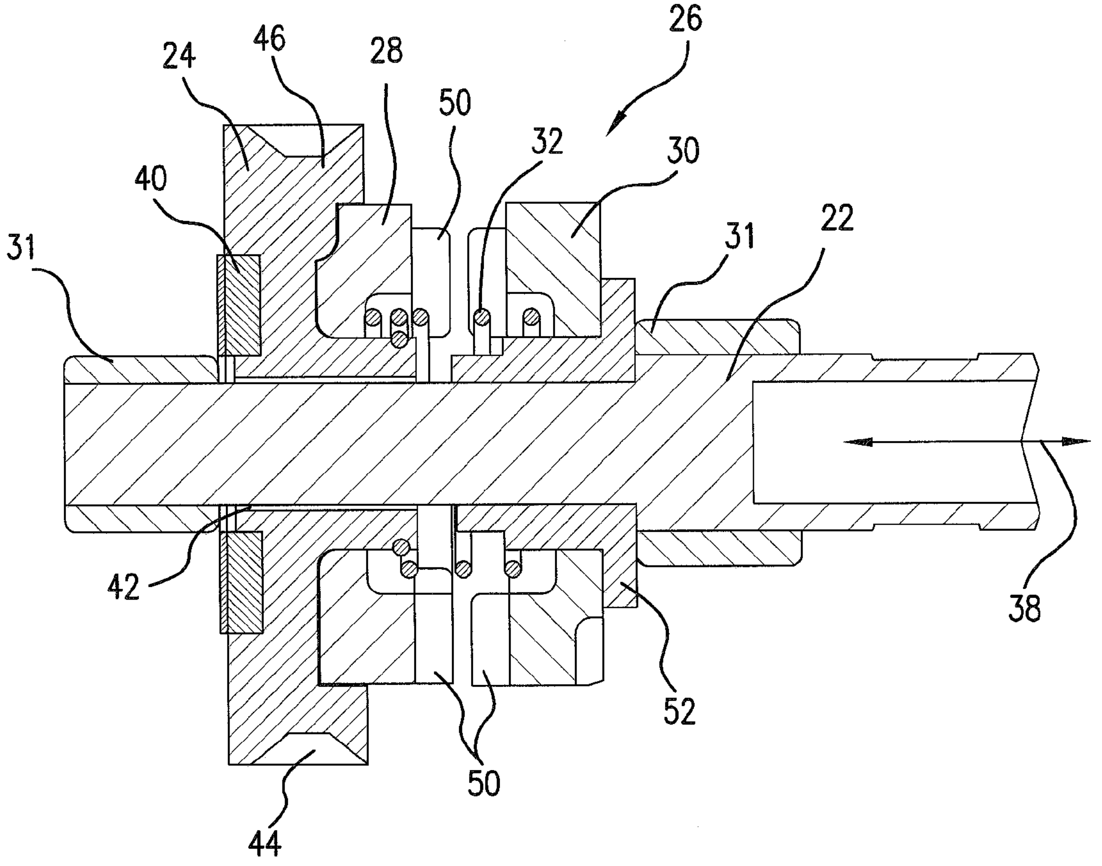
FIG. 2 is a section showing the clutch of the dry construction screwdriver of FIG. 1 in the disengaged state.
Figure 3:
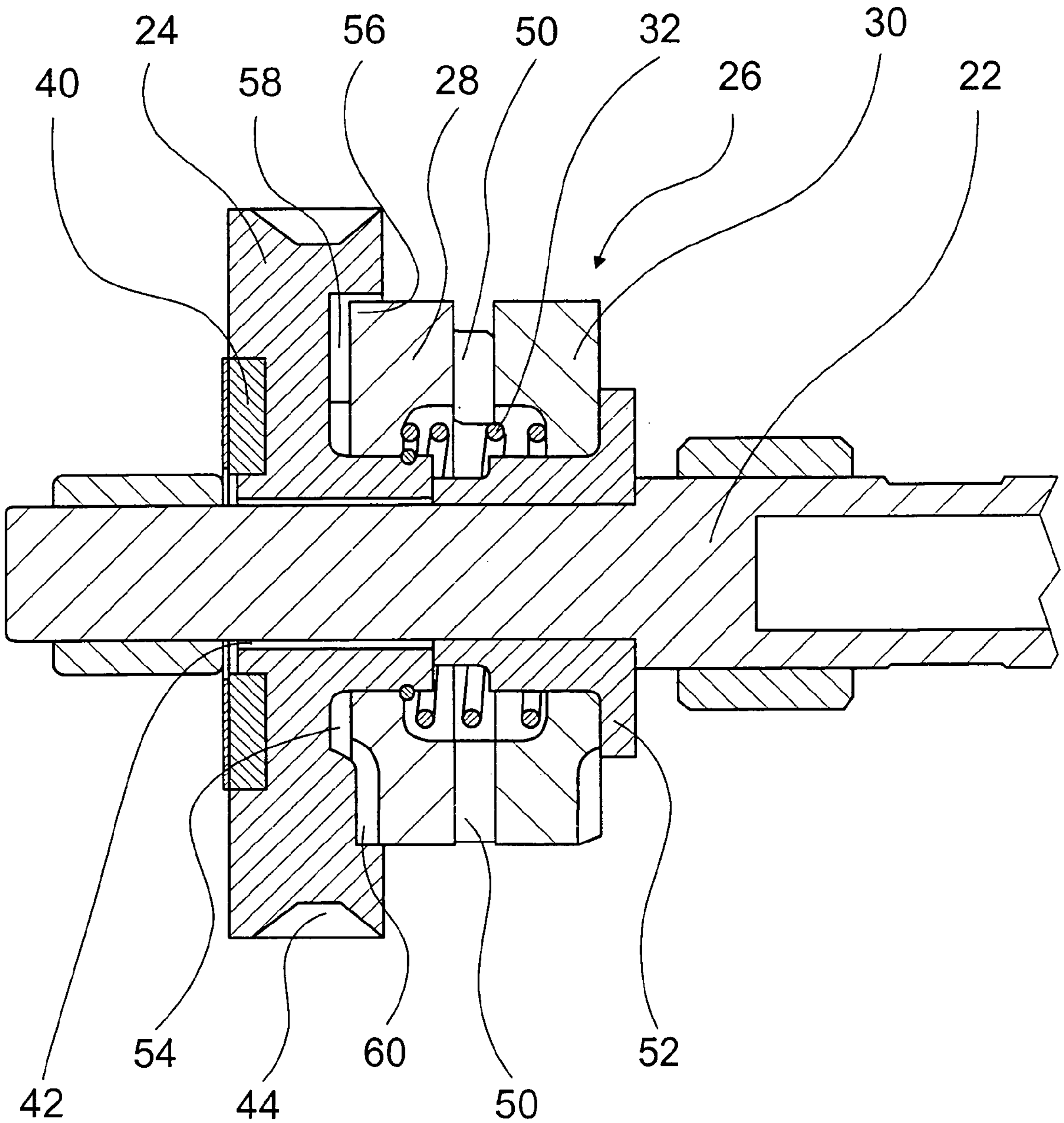
FIG. 3 shows the clutch of FIG. 2 in the engaged state.

To make the mode of operation of the clutch 26 more comprehensible, the clutch is shown on a larger scale and in detail in FIGS. 2 and 3. In FIG. 2, the clutch 26 is shown in the disengaged state. The two clutch halves 28 and 30 are clearly seen; they are spaced apart from one another via the spring element 32. The spring element 32 simultaneously absorbs the pressure of the driven shaft 22 and moves it, as the pressure lets up, and especially when the pressure exerted by the craftsman, when the set screw insertion depth is reached, is absorbed by a depth stop of the dry construction screwdriver, moves the driven shaft back into the outset position, toward the front in the axial direction 38, toward a workpiece.

The gear wheel 24, which supports the first clutch half 28, is supported freely rotatably relative to the driven shaft 22 in a gear wheel bearing 40. This can be seen from a gap 42 between the gear wheel 24 and the driven shaft 22. Via teeth 44, which extend diagonally along the circumference, the gear wheel 24 is driven by the drive shaft 20. The first clutch half 28 is supported rotatably to a certain extent on the gear wheel 24. For that purpose, the first clutch half 28 meshes, via a protuberance 46 that is shown in perspective in FIG. 4, with the gear wheel 24. This meshing furthermore permits an axial displacement of the first clutch half 28 in the axial direction 38 toward the workpiece. Via clutch teeth 50, the first clutch half 28 couples to the second clutch half 30. The second clutch half 30 is connected force-lockingly to a counterpart 52, which in turn is firmly connected to the driven shaft 22.

In the disengaged state, the first clutch half 28 rotates with the gear wheel 24 that is driven by the drive shaft 20. The driven shaft 22—and thus the second clutch half 30—is stopped. If the driven shaft 22, and with it the second clutch half 30, now moves toward the first clutch half 28 as a result of pressure exerted by the craftsman on the screw to be inserted, then a state is reached in which the second clutch half 30, via the clutch teeth 50, is slaved by the first clutch half 28. As a result, the first clutch half 28 simultaneously rotates relative to the gear wheel 24. Via a ramp contour 60, 64 (FIGS. 4, 5), the first clutch half 28 is as a result additionally moved toward the second clutch half 30. The clutch 26 engages. The clutch teeth 50 mesh with one another.

FIG. 3 now shows the clutch 26 in the engaged state. In contrast to FIG. 2, it can be seen that the first clutch half 28 has been displaced forward relative to the gear wheel 24. This can be seen from an axial gap 54. The gear wheel 24 and the clutch halves 28 and 30 have rotated onward compared to FIG. 2. An elevated part 56 of the first clutch half 28 is now visible, which engages a recess 58 in the gear wheel 24. A rear edge of the recess 58 is embodied as a ramp contour 60. On the diametrically opposite side of the first clutch half 28, the edge of a ramp contour 64 can be seen in plan view. The first clutch half 28 and the gear wheel 24 mesh in alternation via respective ramp contours 60, 64.

Figure 4:
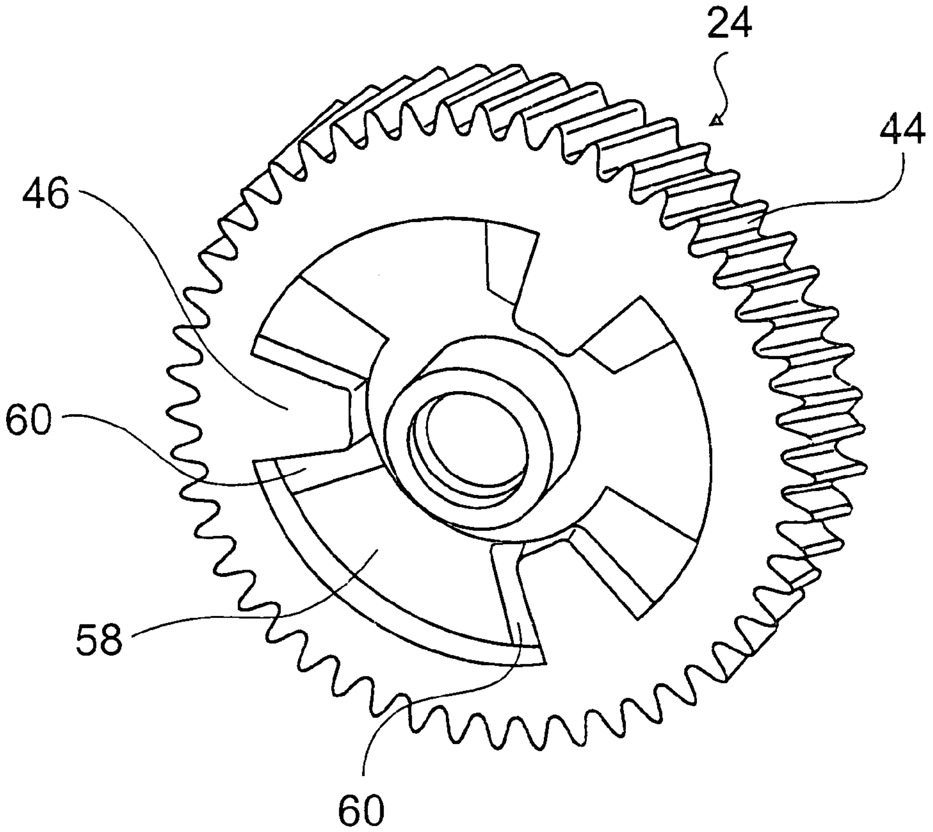
FIG. 4 is a perspective view of a gear wheel, driven by the drive shaft, for receiving the first clutch half.

How the gear wheel 24 is embodied in detail can be seen from the three-dimensional view in FIG. 4. The diagonally extending teeth 44 are clearly visible. On the side oriented toward the first clutch half 28, the gear wheel 24 has a total of three wedge-shaped protuberances 46, which are separated from one another by respective recesses 58. The recesses 58 have one ramp contour 60 on each side in the circumferential direction.

Figure 5:
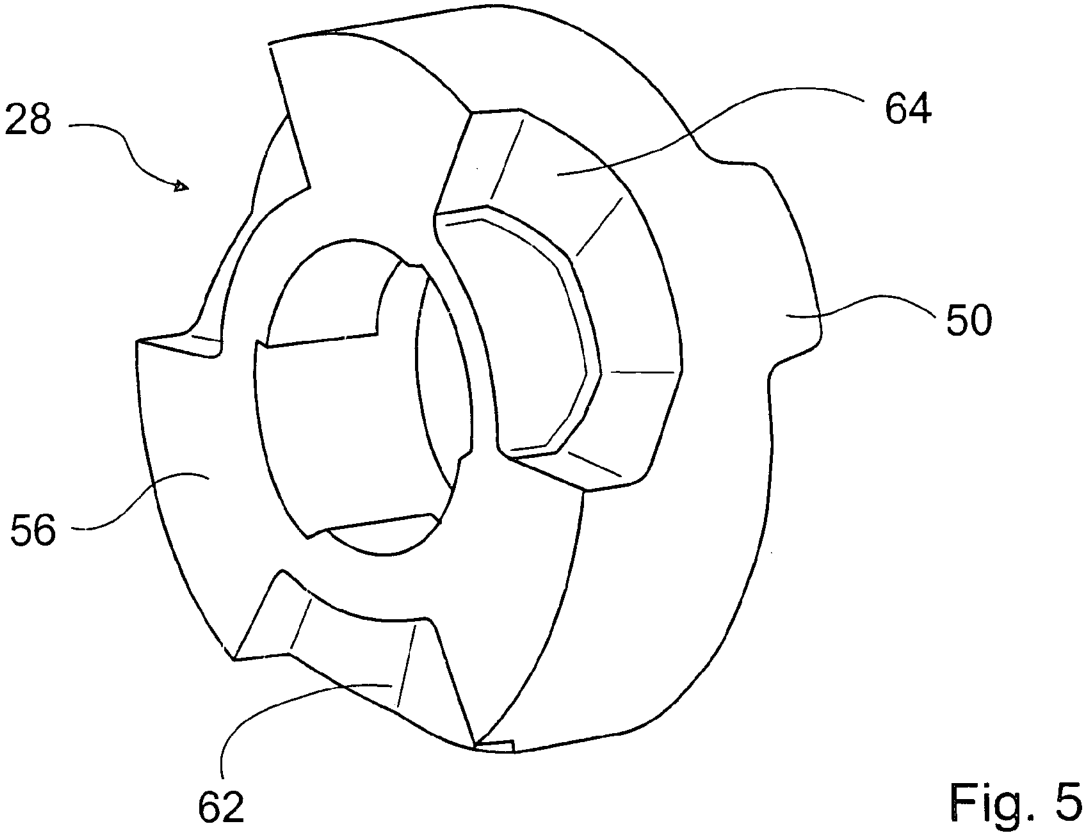
FIG. 5 is a perspective view of the first clutch half.

FIG. 5 shows a more-detailed three-dimensional view of the first clutch half 28. On the side oriented toward the gear wheel 24, the first clutch half 28 likewise has a total of three recesses 62, each spaced apart from one another by an elevated part 56. The three recesses 62 likewise—viewed in the circumferential direction—have one ramp contour 64 on both sides. On the diametrically opposite side, the first clutch half 28 also has three clutch teeth 50. The design shown for the first clutch half 28 can be used identically as the second clutch half 30. The two identically manufactured clutch halves 28 and 30 mesh with one another via the clutch teeth 50.

If the first clutch half 28 and the gear wheel 24 are resting on one another, then the protuberances 46 and the elevated parts 56 of the gear wheel 24 and of the first clutch half 28, respectively, alternatingly engage the recesses 62 and 58 in the first clutch half 28 and in the gear wheel 24, respectively. Upon a relative motion between the gear wheel 24 and the first clutch half 28, the two move away from one another, because of the ramp contours 60 and 64. The boundary of the recesses 62 and 58 serves here as an end stop.

It will be understood that each of the elements described above, or two or more together, may also find a useful application in other types of constructions differing from the types described above.

While the invention has been illustrated and described as embodied in a hand power tool with a clutch, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A hand power tool, comprising a clutch; a motor; a drive shaft located at a side of said motor; a driven shaft to be located at a side of a workpiece, wherein said clutch couples said drive shaft and said driven shaft and enters into engagement when pressure is exerted on said driven shaft, said clutch being provided with a clutch engagement aid, wherein said clutch engagement aid assists and/or accelerates the engaging process of said clutch, wherein said clutch has a first clutch half connected to the drive shaft and a second clutch half connected to the driven shaft, said clutch engagement aid being formed so that at least one of said clutch halves is supported displaceably in an axial direction in a bearing, wherein at least one of said clutch halves is mounted in said bearing, and at least one of said clutch halves meshes with a ramp contour extending in a circumferential direction of a part selected from the group consisting of a counterpart element and a gear element of a shaft selected from the group consisting of said drive shaft and said driven shaft, wherein said clutch halves are configured to move towards one another in said axial direction by means of said clutch engagement aid during a coupling process of said clutch, and wherein said first clutch half is displaced during said coupling process in said axial direction with respect to said gear element supported on said driven shaft, wherein said gear element is formed as a gear wheel.

2. A hand power tool as defined in claim 1, wherein said driven shaft is configured to be passed through both said clutch halves.

3. A hand power tool as defined in claim 2, wherein said clutch has a gear wheel, said clutch engagement aid being located between said gear wheel and said first clutch half connected to said drive shaft.

4. A hand power tool as defined in claim 1, wherein said clutch has a gear wheel connected to said drive shaft and rotatable relative to said driven shaft and also surrounding said driven shaft.

5. A hand power tool as defined in claim 1, wherein said clutch engagement aid is configured to shorten a spacing of said clutch halves when the pressure is exerted on said driven shaft.

6. A hand power tool as defined in claim 1, wherein said clutch engagement aid is configured so that it converts a rotary motion into a translational motion.

7. A hand power tool as defined in claim 1, wherein upon clutch engagement, an initial rotational slaving of said second clutch half by said first clutch half leads to a complete clutch engagement.

8. A hand power tool as defined in claim 1, wherein said at least one clutch half has a number of ramp contours, so that said at least one clutch half and said element selected from the group consisting of a counterpart element and a gear element are in mutual engagement.

9. A hand power tool as defined in claim 1, wherein said drive shaft drives said gear wheel as said gear element, on which said first clutch half meshing with said gear element via the ramp contour is supported axially displaceably.

10. A hand power tool as defined in claim 1, wherein said first and said second clutch halves have an identical form.

11. A hand power tool as defined in claim 1, wherein said clutch engagement aid is configured to move said clutch halves to be pulled into one another.

12. A hand power tool as defined in claim 1, wherein at least one of said clutch halves is in engagement with three ramp contours of said counterpart elements or gear element.

13. A hand power tool as defined in claim 1, wherein said ramp contour includes regions of different slope.

* * * * *